US007532672B2

(12) United States Patent
Rao et al.

(10) Patent No.: US 7,532,672 B2
(45) Date of Patent: May 12, 2009

(54) CODECS PROVIDING MULTIPLE BIT STREAMS

(75) Inventors: Ajit Venkat Rao, Bangalore (IN); Pankaj Rabha, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 562 days.

(21) Appl. No.: 11/308,601

(22) Filed: Apr. 11, 2006

(65) Prior Publication Data

US 2006/0256862 A1 Nov. 16, 2006

(51) Int. Cl.
*H04L 27/00* (2006.01)

(52) U.S. Cl. ....................................... 375/259; 375/265

(58) Field of Classification Search ................. 375/259, 375/265, 341, 295, 316
See application file for complete search history.

(56) References Cited

U.S. PATENT DOCUMENTS

| | | | | |
|---|---|---|---|---|
| 6,253,185 | B1 | 6/2001 | Arean et al. | |
| 6,983,243 | B1 | 1/2006 | Goyal et al. | |
| 2004/0013207 | A1 * | 1/2004 | Sartori et al. | 375/297 |
| 2004/0208120 | A1 * | 10/2004 | Shenoi | 370/229 |

* cited by examiner

*Primary Examiner*—Emmanuel Bayard
(74) *Attorney, Agent, or Firm*—Steven A. Shaw; W. James Brady; Frederick J. Telecky, Jr.

(57) ABSTRACT

According to an aspect of the present invention two streams data encoding corresponding information contained in a multimedia signal are generated with one bitstream ("first stream") providing for reproduction of the information with a base quality (e.g., according to a corresponding standard), and the second bitstream ("second stream") containing information which can be used to further enhance the quality of reproduction.

20 Claims, 2 Drawing Sheets

CODECS PROVIDING MULTIPLE BIT STREAMS

RELATED APPLICATIONS

The present application is related to and claims priority from co-pending India Patent Application Serial Number: 510/CHE/2005, Entitled, "Enhanced Multi_Bit stream Codec", filed: Apr. 28, 2005, naming the same inventors as in the subject application, and is incorporated in its entirety herewith.

BACKGROUND OF THE INVENTION

1. Field of the Invention

The present invention relates generally to the multimedia signal processing and more specifically to the design and implementation of a codec/device providing multiple bit streams 2. Related Art Multimedia data is often generated from a multimedia signal (such as voice, video and/or audio signal) at one end system and transferred for reproduction at another end system over a network. Generally, the multimedia data (representing information contained in the multimedia signal) is generated using codecs/devices implemented according to standards or techniques. For example, data representing voice, video or audio may be respectively generated according to standards G.729, MPEG 4, G.711 using the corresponding codecs (coder-decoders) or proprietary methods implemented in the devices.

The multimedia data may be provided as a bit stream and transferred on packet network (e.g., cable network). The other end system implementing compatible standards may receive packets from network and reproduce corresponding multimedia signal.

The reproduction of multimedia signal at the other end system can be measured by various quality parameters. For example, in the case of speech the quality parameters like PESQ or MOS can be used. In case of video higher resolution can be used as a quality parameter.

Generally, higher quality requires a higher amount of data bits to encode the same multimedia signal resulting in a transfer of large quantity of data bits. Such transfer of higher bits may be undesirable at least some times (e.g., due to higher per bit transfer cost over a network or high potential packet drop rate at that time). Further, end systems implementing a specific standard provides a fixed quality of reproduction defined by the corresponding standard.

There is a need to provide higher quality in reproducing the information at least in some of the situations noted above.

BRIEF DESCRIPTION OF THE DRAWINGS

The present invention will be described with reference to the following accompanying drawings.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present invention two bitstreams of multimedia packets are generated to encode a multimedia signal, with one bitstream ("first bitstream") providing for reproduction of the information with a base quality, and another bitstream ("second bitstream") containing data which can be used to further enhance the quality of reproduction.

In one embodiment, the first bitstream is transferred on a channel setup with guaranteed set of QoS parameters on a network providing differential QoS, and the second bitstream is transferred on another channel for which bandwidth or delivery is not guaranteed (e.g., bursty transport subject to availability of bandwidth). Accordingly, information may be guaranteed to be reproduced with a quality consistent with the guaranteed QoS, while enhanced quality is attained at least in some durations when the data is delivered by the second channel.

In another embodiment, the first bitstream is generated according to a specific convention (or standard) which permits the information to be reproduced with acceptable quality. The second stream contains additional information that, in conjunction with the first stream allows multimedia quality better than the quality guaranteed by the first stream only. As a result, the implementations can be backward compatible with codecs (end systems) which are not designed to support enhanced quality of reproduction, i.e., codecs supporting only the standards but not the enhanced quality.

According to one more aspect of the present invention, a decoder module internally generates the second bitstream when such a second bitstream is not received from the encoder module. Techniques such as extrapolation and digital signal processing approaches may be used to generate the second bitstream. The reproduction may thus be artificially (sought to be) enhanced.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example Environment

Figure 1:
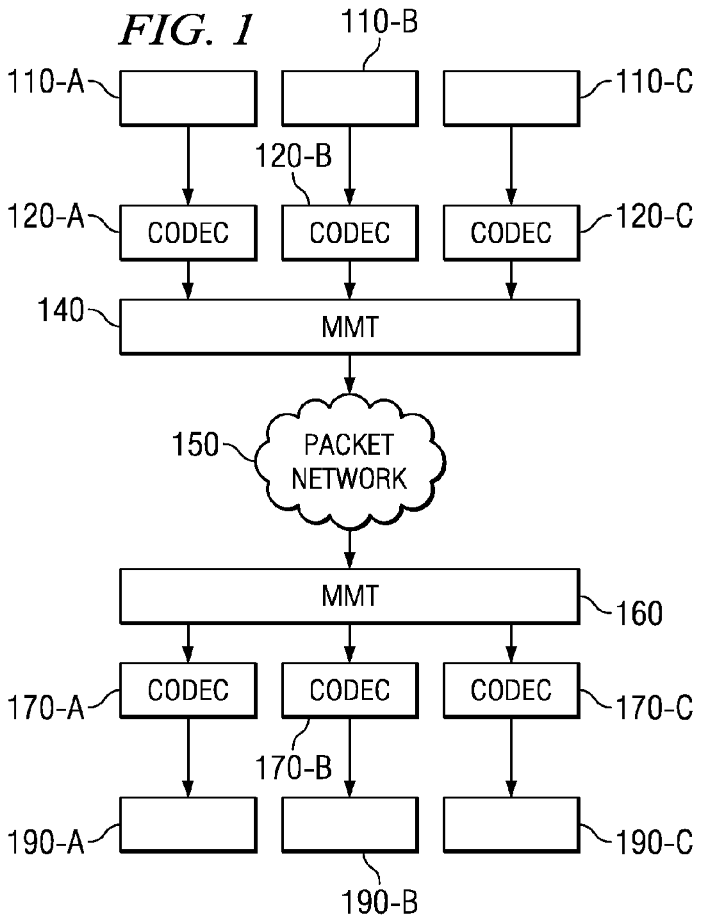
FIG. 1 is a block diagram of an example environment in which various aspects of the present invention can be implemented.

FIG. 1 is a block diagram of an example environment in which various aspects of the present invention can be implemented. The block diagram is shown containing image source 110A, voice source 110B, audio source 110C, codecs 120A-120C and 170A-170C, multimedia terminals (MMT) 140 and 160, packet network 150, display device 190A, speaker 190B, and audio system 190C. Each system is described below in further detail.

Merely for illustration systems 110A-110C are described as sources of multimedia signal and 190A-190C as reproducing systems. Thus, codecs 120A-120C are referred to as encoders and codecs 170A-170C are referred to as decoders in the description below. However, often both capabilities are contained in each system.

Packet network 150 provides channels for transmitting data with differential QoS (quality of services). In an embodiment, the network is implemented using DOCSIS protocol on a cable medium. As is well known, some of the channels may be provisioned for guaranteed QoS (e.g., a very low packet drop rate and guaranteed bandwidth) and other channels may be provisioned for providing best effort QoS, for which otherwise unused bandwidth is allocated dynamically.

Multimedia terminal MMT 140 receives multimedia data from each encoder 120A-120C, and forwards the data to MMT 160 on packet network 150. MMT 160 transfers the received packets to corresponding decoders 170A-170C for further processing. The multimedia packets may be transferred/received from corresponding codecs as data packets formed according to real transfer protocol (RTP).

Each encoder 120A, 120B and 120C generates multimedia data from corresponding multimedia signal provided by sources 110A-110C. The multimedia data is provided to MMT 140 using desired packet formats such as RTP. Deooders 170A-170C receives multimedia data from MMT 160 and extracts information contained in the multimedia signal to generate a reproduction signal. The reproduction signals are provided to corresponding reproduction systems 190A-190C to reproduce the information content (e.g., music, video, etc.) originally encoded in the source signal provided by sources 110A through 110C.

In general, the quality of reproduction depends on the amount of information contained in the data used to represent the corresponding multimedia source signal. The amount of information has a positive correlation with the amount of data used for encoding the source signal assuming encoding technique of same/identical/equal efficacy.

However, limits are practically imposed on the amount of data that is used for encoding the signals due to reasons such as bandwidth limitations, the encoding standards, etc. However, each encoding standard generally provides for at least some (often fixed) quality level ("base quality"). Various features of the present invention enable the reproduction quality to be enhanced, as described below in further detail.

3. Generation of Multimedia Data

Figure 2:
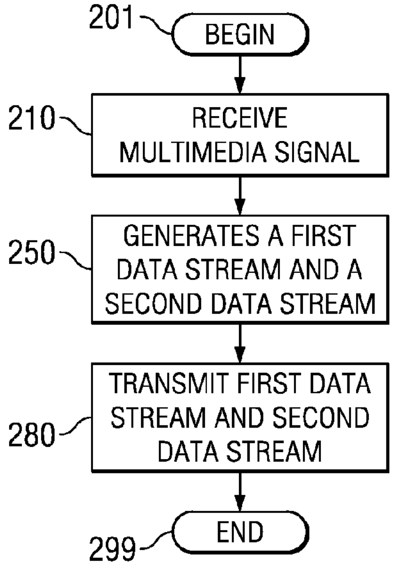
FIG. 2 is a flowchart illustrating the manner in which a source system may operate to facilitate high quality reproduction of information content according to an aspect of present invention.

FIG. 2 is a flowchart illustrating the manner in which the quality of reproduction of information content is enhanced according to an aspect of present invention. The flowchart is described with reference to FIG. 1 for illustration. However, the approaches can be implemented in other environments as well without departing from the scope and spirit of various aspects of the present invention, as will be apparent to one skilled in the relevant arts by reading the disclosure provided herein. Also, for illustration, flowchart is described with reference to encoder 120A. The flowchart begins in step 201 and control immediately passes to step 210.

In step 210, encoder 120A receives a multimedia (information) signal from source 110A. The information signal contains information content and may be received in analog domain with suitable voltage levels. The information signal may be pre-processed (pre-amplification, noise elimination etc) and provided to encoder 120.

In step 250, encoder 120A generates a first bitstream and a second bitstream. The first bitstream may contain sufficient information to reproduce the information content with a first quality level and the second bitstream may contain additional information enabling the quality level to be enhanced.

In step 280, encoder 120A transmits the first bitstream and the second bitstream of data to MMT 140. The first bitstream and second bitstream are transmitted to MMT 140 as respective (separate) RTP stream of packets such that the specific data elements can be correlated in time domain. RTP is described in further detail in IETF RFCs 1889 and 2509. Thus, the first RTP stream may contain payloads encoding the first bitstream along with any protocol specific information. For example, the RTP stream of data may be encoded according to RFC 3551 assuming the first bitstream represents voice signal sampled according to G729. The data for the second bitstream may be encoded using one of several well known approaches. Flowchart ends in step 299.

Due to above approach, encoder 120A may transmit bitstream (first bitstream) representing a desired amount of information according to a desired standard (or any convention) without limiting the generation of sequence of data bits (representing more information) to the corresponding standard. Information not sent in the first bitstream may then be sent in the second bitstream. As a result, information may be represented in digital format with a desired high quality and the enhanced/additional information may be transmitted using multiple bitstreams.

The manner in which a codec/device may reproduce high quality multimedia signal using multiple bitstreams is described below with reference to FIG. 3.

4. High Quality Signal Reproduction

Figure 3:
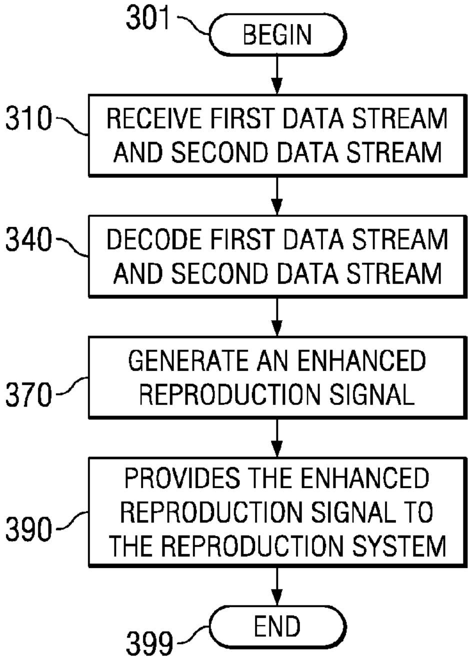
FIG. 3 is a flowchart illustrating the manner in which a receiver system may operate to facilitate high quality reproduction of information content according to an aspect of present invention.

FIG. 3 is a flowchart illustrating an approach for generating a high quality reproduction signal according to an aspect of present invention. The flowchart is described with reference to FIGS. 1 and 2 for illustration. However, the approaches can be implemented in other environments as well without departing from the scope and spirit of various aspects of the present invention, as will be apparent to one skilled in the relevant arts by reading the disclosure provided herein. Also, for illustration, the flowchart is described with reference to codec 170A. The flowchart begins in step 301 and control immediately passes to step 310.

In step 310, decoder 170A receives the first bitstream and the second bitstream. Both the bitstreams may be received through multimedia terminal 160 in RTP packet format defined by corresponding RFC or by using a pre-defined proprietary protocol.

In step 340, decoder 170A decodes first bitstream and second bitstream. The information represented by first bitstream and second bitstream is extracted by performing decoding operation according to the corresponding standards/protocols (RTP). Thus, the decoded output represents the samples (information content) encoded at the transmission end.

In step 370, decoder 170A generate a enhanced reproduction signal. The extracted information from first bitstream and second bitstream may be combined in conjunction with the step 250. The combined information is used for generating enhanced reproduction signal. In step 390, decoder 170A provides the enhanced reproduction signal to the corresponding reproduction system (190A), which causes the information content to be reproduced. Flowchart ends in step 399.

Due to the above approach, the codec operating according to corresponding standard may be extended to produce a high quality (higher than quality provided by corresponding standard) reproduction signal using second bitstream.

The manner in which a information contained in a multimedia signal may be separated and represented using first bitstream and second bitstream is further illustrated below with an example audio signal.

5. Example First and Second Bitstream

Figure 4A:
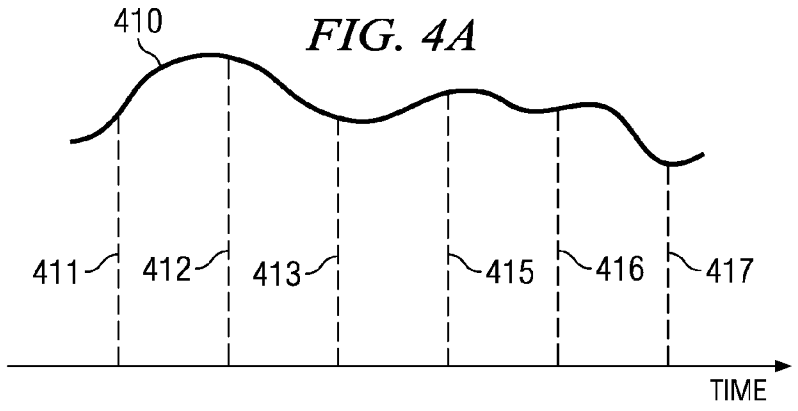
FIGS. 4A and 4B illustrate the manner in which information content of a multimedia signal is provided in two bit streams according to an aspect of present invention.
Figure 4B:
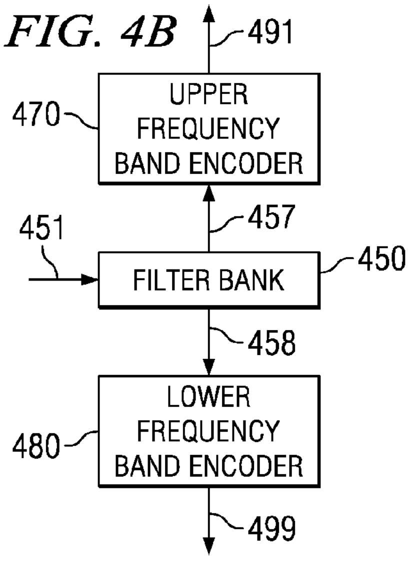

FIGS. 4A and 4B together illustrate the manner in which information contained in multimedia signal is transmitted in two bitstreams according to an aspect of present invention. FIG. 4A is a graph illustrating sampling of a multimedia signal. The graph is shown containing multimedia signal 410. For illustration, it is assumed that the multimedia signal 410 represent audio/voice and sampled at a desired frequency (e.g., 16 KHz), generating samples at time points 411-417.

The manner in which two or more bitstreams of multimedia data are generated from samples 411-417 in one embodiment of the present invention is described below with reference to FIG. 4B. Shown there is a filter bank 450, upper frequency band encoder 470 and lower frequency band encoder 480. Filter bank 450 receives samples 411-417 on path 451 and provides sample values representing lower frequency band on path 455 and sample values representing higher frequency band on path 459.

The specific desired spectrums forming the upper frequency band and lower frequency band depend on the specific information content being encoded. For example, in the case of an audible voice signal, 0-4 Khz band may be used for the lower frequency band (since that band contains sufficient information to reproduce the voice signal) and the rest of the band (4-8 Khz) may be used for the higher frequency band. Filter bank 450 may be implemented using one of several known techniques such as the quadrature mirror filter (QMF) technique. In general, the coefficients of the filter bank need to be configured to separate the frequency bands, as suitable for the specific environment.

Lower frequency band encoder 480 receives sample values representing lower frequency component of signal 410 on path 458 and generates a first bit stream on path 499. Upper frequency band encoder 470 receives samples representing higher frequency component of signal 410 on path 457 and generates second bit stream on path 491.

As may be appreciated, multimedia signal may be sampled at higher frequency and represented using two bit stream each having a lower bit rate than a single stream representing the samples sampled at higher frequency. The manner in which quality of reproduction may be correspondingly enhanced using the data in both the bitstreams is described below.

On the receiver side, MMT 160 receives first bitstream and second bitstream respectively representing bitstreams on paths 499 and 491 of the transmitter side and provides both bitstreams to the decoder 170A. Decoder 170 decodes first bitstream using lower frequency band decoder (not shown) techniques and generates low frequency values (components).

Similarly higher frequency decoder (not shown) is used to decode second bitstream to generate the higher frequency component. Both higher frequency components and lower frequency components may be combined once again using a filter bank (not shown) technique to generate a high quality voice/audio signal.

While the above example is provided with respect to generating multiple bitstream based on splitting frequency components, other techniques suitable for the specific environments may also be used. For example, in case of representing images, if the convention/standard used requires representation in 8 bits, the codec may generate 12-bit samples and send the additional four bits in the second bitstream. As another example, if a standard requires 2^8 ('^' representing power of operation) quantization levels, additional bits may be generated to represent the residue not represented by the 8 bit samples.

The two bitstreams may be combined while performing the reverse operation in the decoder compared to those performed at the transmitter side to obtain high quality reproduction. For example, for every 8 bits received on the first bitstream, the corresponding 4 LSB bits from second bitstream may be added to generate signal quality with 12 bits resolution.

It may be appreciated that in both the example above, even when the second bitstream is not received or received in error, multimedia signal may be reproduced with a minimum desired quality from the first bitstream. Accordingly, first bitstream and second bitstream may be transferred over channels having different channel quality.

The manner in which the multiple bitstreams may be transferred to a receiving system using multiple channels is illustrated below with respect to FIG. 5.

6. Transmission Over Multiple Channels

Figure 5:
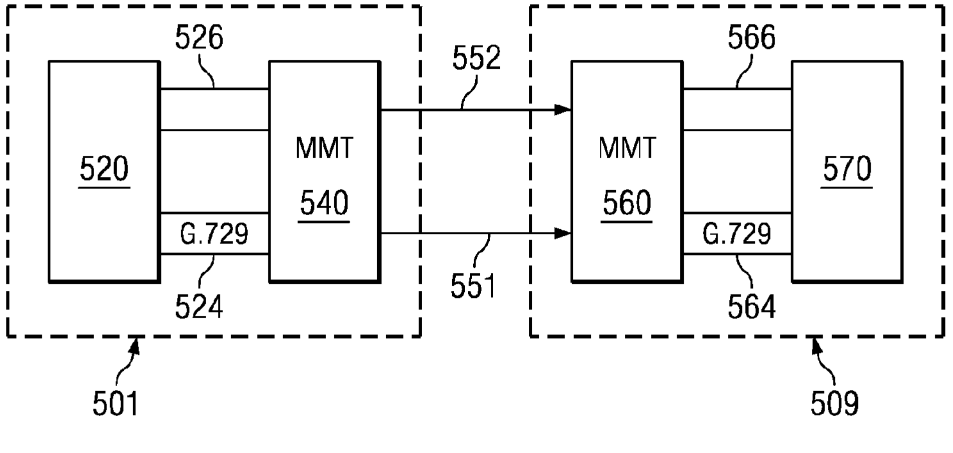
FIG. 5 is a block diagram illustrating transmission of multiple bitstream over a packet network in an example embodiment of the present invention.

FIG. 5 is a block diagram illustrating transmission of multiple bitstream over a packet network in an example embodiment of the present invention. The block diagram is shown containing codecs 520 and 570, multimedia terminals 540 and 560 and channels 551 and 552. Each block is described below in further detail.

Encoder 520 and multimedia terminal 540 together operate as transmit system 501 and Decoder 570 and multimedia terminal 560 together operate as receive system. Blocks 520 and 570 are respectively implemented to perform operations according to the descriptions of FIG. 2 and FIG. 3. Accordingly, encoder 520 receives multimedia signal on path 511 and generates a first datastream (according to a standard G729 and corresponding RTP) on path 524 and a second bitstream (according to a proprietary protocol with RTP containing proprietary identifier) on path 526.

MMT 540 receives first bitstream and second bitstream respectively on path 524 and 526. The first bitstream is encapsulated into network packets (containing destination address) using network protocols such as TCP IP or UDP and transmitted to desired destination over channel 551. The second bitstream is encapsulated with the same destination address and transmitted over channel 552.

MMT 560 receives network packets on channels 551 and 552. MMT 560 extracts first bitstream from the packets received on channel 551 and extracts the second bitstream from packets received on channel 552. MMT 560 provides first bitstream on path 564 and second bitstream on path 566 in corresponding RTP format.

Decoder 570 receives a first bitstream on path 564 and a second bitstream on path 566 and combines information contained in first bitstream and second bitstream and generates an enhanced reproduction signal. The enhanced reproduction signal is provided on path 579 to the reproduction system.

Channel 551 and 552 represents communication channel provided by packet network 150. In an embodiment, channel 551 provides a guaranteed QoS and channel 552 provides best effort QoS. In an embodiment, the channels are implemented as ATM channels. The ATM network (on which channels 551 and 552 are implemented) is designed to guarantee the QoS parameters (bandwidth/delay) negotiated for channel 551. On the other hand, channel 552 is setup without guaranteed parameters (e.g., provide bursty transport when the bandwidth is available, and the channel may be subject to more loss). Transmit system 501 transmits the first bitstream on channel 551 and second bitstream on channel 552.

As a result the first bitstream are provided to receiving system 509 potentially without any packet loss there by providing the minimum quality of reproduced signal according to the standard. Further, since second bitstream is transmitted on channel 552, the cost associated in transmitting enhanced/additional bits are reduced.

The manner in which a codec provided according to an aspect of the present invention (compliant codec) may be operated along with codecs (non-compliant codec) designed to receive single/standard bit streams thereby providing compatibility is described below.

7. Compatibility

Figure 6:
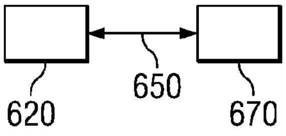
FIG. 6 is a block diagram illustrating the manner in which a codec operating using the multiple streams can cooperatively operate with codecs not implementing such features.

FIG. 6 illustrates a scenario in which compliant (codec implemented according to present invention) encoder 620 sends two bitstreams (551 and 552) to non-compliant decoder 670 on path 650. Non-compliant decoder 670 may simply ignore the bitstream 552 and yet reproduce data according to data received on stream 551.

On the other hand, when decoder 670 receives only a single bitstream (551) from non-compliant encoder 620 (on path 650), decoder 670 may generate the bitstream 552 by appropriate mathematical approaches (extrapolation, digital signal processing techniques, etc.). Information is then reproduced from the two bitstreams 551 and extrapolated 552, with an attempt to enhance the quality of reproduction.

It should be further appreciated that the information of bitstream 551 can be used to reproduce information alone even if corresponding samples on bitstream 552 are lost (e.g., because of dropping of packets in network 150). As a result, the probability of reproducing information with at least some acceptable quality may be enhanced.

Also, it should be understood that a service provider can provision a higher QoS channel for channel 551 and a lower QoS (best effort QoS) for channel 552, and thus provide differentiated services.

8. Example Embodiments

In an embodiment, a family of scalable multi_rate wideband speech codecs are implemented using the approaches described above. A splitband coding approach may be employed. The input, which is sampled at 16 KHz, is divided into two frequency bands from 0-3.4 KHz and 3.4-8 KHz. The lower band is encoded using a standards compliant narrow_band coding algorithm such as ITU G.728. In the higher band, a bit_rate scalable parametric coding model called Noise excited sub_band LPC (NXSL) is proposed.

Depending upon demand or network availability, the higher band can operate at several possible bit_rates. The sampling rate of the output is always set to 16 KHz. The quality of the output wideband speech depends on the bit_rate allocated to the NXSL model. As an extreme case, when channel conditions prevent the availability of the NXSL bit_stream, the decoder can generate the wideband signal by extrapolating the high_band information from the narrow_band decoded signal.

One benefit of this approach is that the narrow-band information is compatible with the standard, while additional "side" information is used to improve subjective quality. The approaches may be implemented using a standard 16_kbps narrow-band codec. The subjective quality of the codec designed using the above approach is comparable to that of the ITU standard G.722 for some of the experiments.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of processing a multimedia signal containing an information content, said method comprising:

receiving said multimedia signal;

generating a first bit stream and a second bit stream from said multimedia signal;

sending said first bit stream on a first channel and said second bit stream on a second channel to a receiver system, wherein said first channel and said second channel represent corresponding separate channels of a packet network, wherein said first bit stream represents said information content with a first quality level, and wherein said second bit stream in combination with said first bit stream enables said information content to be represented with a second quality level, said second quality level being greater than said first quality level, wherein said first channel transfers said first bit stream with a first plurality of Quality of Service (QoS) parameters and said second channel transfers said second bit stream with a second plurality of QoS parameters, wherein said first plurality of QoS parameters are not identical to said second plurality of QoS parameters.

2. The method of claim 1, wherein said first plurality of QoS parameters are pre-negotiated and are guaranteed on said first channel by said packet network, and wherein said second plurality of QoS parameters comprises a bandwidth allocation which is not guaranteed on said second channel by said packet network.

3. The method of claim 2, wherein said packet network is provided on a packet cable network medium.

4. The method of claim 2, wherein said generating comprises:

sampling said multimedia signal to generate a plurality of samples;

forming a first set of values representing a lower frequency band of said multimedia signal and a second set of values representing a upper frequency band of said multimedia signal by processing said plurality of samples, wherein said first bit stream comprises said first set of values and said second bit stream comprises said second set of values.

5. The method of claim 2, wherein said generating comprises quantizing said multimedia signal to generate a plurality of samples with each sample being represented using n-bits, wherein said first bit stream comprises m most significant bits of each of said samples and said second bit stream comprises the remaining bits of each of said samples, wherein n and m are integers and m is less than n.

6. A method of reproducing an information content of a multimedia signal in a receiver system, said method comprising:

receiving a first bit stream on a first channel and a second bit stream on a second channel from a receiver system, wherein said first channel and said second channel represent corresponding separate channels of a packet network, wherein said first bit stream represents said information content with a first quality level, and wherein said second bit stream in combination with said first bit stream enables said information content to be represented with a second quality level, said second quality level being greater than said first quality level, wherein said first channel transfers said first bit stream with a first plurality of Quality of Service (QoS) parameters and said second channel transfers said second bit stream with a second plurality of QoS parameters, wherein said first plurality of QoS parameters are not identical to said second plurality of QoS parameters; and generating a plurality of values representing said information content with said second quality level using said first bit stream and said second bit stream, wherein said plurality of values are used to reproduce said information content.

7. The method of claim 6, wherein said packet network is provided on a packet cable network medium.

8. The method of claim 6, wherein said generating comprises:

forming a first set of values representing a lower frequency band of said multimedia signal from said first bit stream and forming a second set of values representing a upper frequency band of said multimedia signal from said second bit stream, wherein said plurality of values are obtained from both of said first set of values and said second set of values.

9. The method of claim 6, wherein said generating comprises:

forming a first set of values representing m most significant bits of each of a plurality of samples from said first bit stream, and a second set of values representing the remaining (n-m) bits of each of said samples, wherein each of said plurality of samples contains n bits, wherein n and m are integers and m is less than n, and wherein said plurality of values are obtained from said plurality of samples.

10. The method of claim 6, further comprising:

receiving a third bit stream on third channel, said third bit stream also representing said information content with said first quality level;

extrapolating data in said third bit stream to generate a fourth bit stream, said fourth bit stream in combination with said third bit stream enables said information content to be represented with said second quality level; and generating a second plurality of values representing said information content with said second quality level using said third bit stream and said fourth bit stream.

11. An encoder for processing a multimedia signal containing an information content, said encoder comprising:

means for receiving said multimedia signal;

means for generating a first bit stream and a second bit stream from said multimedia signal;

means for sending said first bit stream on a first channel and said second bit stream on a second channel to a receiver system, wherein said first channel and said second channel represent corresponding separate channels of a packet network, wherein said first bit stream represents said information content with a first quality level, and wherein said second bit stream in combination with said first bit stream enables said information content to be represented with a second quality level, said second quality level being greater than said first quality level, wherein said first channel transfers said first bit stream with a first plurality of Quality of Service (QoS) parameters and said second channel transfers said second bit stream with a second plurality of QoS parameters, wherein said first plurality of QoS parameters are not identical to said second plurality of QoS parameters.

12. The encoder of claim 11, wherein said first plurality of QoS parameters are pre-negotiated and are guaranteed on said first channel by said packet network, and wherein said second plurality of QoS parameters comprises a bandwidth allocation which is not guaranteed on said second channel by said packet network.

13. The encoder of claim 12, wherein said packet network is provided on a packet cable network medium.

14. The encoder of claim 12, wherein said means for generating samples said multimedia signal to generate a plurality of samples, and forms a first set of values representing a lower frequency band of said multimedia signal and a second set of values representing a upper frequency band of said multimedia signal by processing said plurality of samples, wherein said first bit stream comprises said first set of values and said second bit stream comprises said second set of values.

15. The encoder of claim 12, wherein said means for generating quantizes said multimedia signal to generate a plurality of samples with each sample being represented using n-bits, wherein said first bit stream comprises m most significant bits of each of said samples and said second bit stream comprises the remaining bits of each of said samples, wherein n and m are integers and m is less than n.

16. A decoder for reproducing an information content of a multimedia signal in a receiver system, said decoder comprising:

means for receiving a first bit stream on a first channel and a second bit stream on a second channel from a receiver system, wherein said first channel and said second channel represent corresponding separate channels of a packet network, wherein said first bit stream represents said information content with a first quality level, and wherein said second bit stream in combination with said first bit stream enables said information content to be represented with a second quality level, said second quality level being greater than said first quality level, wherein said first channel transfers said first bit stream with a first plurality of Quality of Service (QoS) parameters and said second channel transfers said second bit stream with a second plurality of QoS parameters, wherein said first plurality of QoS parameters are not identical to said second plurality of QoS parameters; and means for generating a plurality of values representing said information content with said second quality level using said first bit stream and said second bit stream, wherein said plurality of values are used to reproduce said information content.

17. The decoder of claim 16, wherein said packet network is provided on a packet cable network medium.

18. The decoder of claim 16, wherein said means for generating forms a first set of values representing a lower frequency band of said multimedia signal from said first bit stream and forming a second set of values representing a upper frequency band of said multimedia signal from said second bit stream, wherein said plurality of values are obtained from both of said first set of values and said second set of values.

19. The decoder of claim 16, wherein said means for generating forms a first set of values representing m most significant bits of each of a plurality of samples from said first bit stream, and a second set of values representing the remaining (n-m) bits of each of said samples, wherein each of said plurality of samples contains n bits, wherein n and m are integers and m is less than n, and wherein said plurality of values are obtained from said plurality of samples.

20. The decoder of claim 16, further comprising:

means for receiving a third bit stream on third channel, said third bit stream also representing said information content with said first quality level;

means for extrapolating data in said third bit stream to generate a fourth bit stream, said fourth bit stream in combination with said third bit stream enables said information content to be represented with said second quality level; and means for generating a second plurality of values representing said information content with said second quality level using said third bit stream and said fourth bit stream.

* * * * *